(12) United States Patent
Fujii et al.

(10) Patent No.: US 6,859,062 B2
(45) Date of Patent: Feb. 22, 2005

(54) APPARATUS AND METHOD FOR INSPECTING A BOARD USED IN A LIQUID CRYSTAL PANEL

(75) Inventors: Tatuhisa Fujii, Fukuyama (JP); Shogo Ishioka, Fukayasu-gun (JP)

(73) Assignee: OHT Inc., Hiroshima (JP)

( * ) Notice: Subject to any disclaimer, the term of this patent is extended or adjusted under 35 U.S.C. 154(b) by 145 days.

(21) Appl. No.: 10/069,520

(22) PCT Filed: Jul. 5, 2001

(86) PCT No.: PCT/JP01/05838
§ 371 (c)(1),
(2), (4) Date: Nov. 5, 2002

(87) PCT Pub. No.: WO02/03083
PCT Pub. Date: Jun. 5, 2001

(65) Prior Publication Data
US 2003/0117164 A1 Jun. 26, 2003

(30) Foreign Application Priority Data
Jul. 5, 2000 (JP) ........................ 2000-204263

(51) Int. Cl.[7] .............................................. G01R 31/00
(52) U.S. Cl. .................................... 324/770; 324/158.1
(58) Field of Search ................................ 324/770, 765, 324/750, 500–501, 537; 349/192; 345/904

(56) References Cited

U.S. PATENT DOCUMENTS

| | | | | | |
|---|---|---|---|---|---|
| 4,870,357 | A | * | 9/1989 | Young et al. | 324/770 |
| 5,258,705 | A | * | 11/1993 | Okamoto et al. | 324/770 |
| 5,311,137 | A | * | 5/1994 | Chang et al. | 324/501 |
| 5,614,839 | A | * | 3/1997 | Bosacchi | 324/770 |

* cited by examiner

Primary Examiner—Vinh P. Nguyen
(74) Attorney, Agent, or Firm—Westerman, Hattori, Daniels & Adrian, LLP

(57) ABSTRACT

The present invention provides an inspection apparatus and inspection method capable of inspecting the shape of a board used in a liquid crystal panel with high fineness and efficiency. A computer 21 controls an X-electrode select section 22 and a Y-electrode select section 23 to drive liquid crystal driving electrodes 102 selectively. A FLASHSHOCK Sensor 1 is located at a position opposed to a board 100 in a non-contact manner. The FLASHSHOCK Sensor 1 is adapted to detect each potential variation caused in the liquid crystal electrodes 101–104 and then output the detected potential variation to the computer 21 as a detect signal. The computer 21 receives the detect signal from the FLASHSHOCK Sensor 1 to create image data, and detects disconnection, short-circuit, chipping or the like in the liquid crystal electrodes based on the created image data. Further, the computer 21 displays an image representing each shape of the liquid crystal electrodes on a display 21a.

12 Claims, 17 Drawing Sheets

APPARATUS AND METHOD FOR INSPECTING A BOARD USED IN A LIQUID CRYSTAL PANEL

TECHNICAL FIELD

The present invention relates to an apparatus and method for inspecting an electrode of a board used in a liquid crystal panel.

BACKGROUND ART

For the purpose of detecting a defect in an electrode of a board used in a liquid crystal panel, there has heretofore been employed a process comprising the steps of driving (charging) all liquid crystal pixels after assembling a liquid crystal panel, discharging each electric charge in the pixels, passing the resulting discharge current through a resistance provided outside the liquid crystal panel, and detecting voltage drop across the resistance.

However, this conventional process of inspecting a liquid crystal panel has not been available for inspecting a 50-µm level circuit pattern with sufficiently high resolution. Even for a liquid crystal panel having a relatively large electrode, the conventional technique has not been able to go so far as to detect the shape of the electrode. Further, the work sequence of carrying out the inspection after assembling a liquid crystal panel can cause lowered productivity in connection with defective products to be possibly identified by the inspection, and has caused the complexity in an operation for setting an inspection apparatus to the assembled liquid crystal panel.

In order to solve the above problems of the prior art, it is an object of the present invention to provide an inspection apparatus and inspection method capable of inspecting the shape of a board used in a liquid crystal panel with high fineness and efficiency.

DISCLOSURE OF THE INVENTION

In order to achieve the above object, according to the present invention, there is provided an inspection apparatus for inspecting a board used in a liquid crystal panel, in which a liquid crystal driving signal is applied to the board to cause a potential variation in an electrode of the board, and the potential variation is detected in a non-contact manner, comprising detect means for detecting the potential variation in the electrode by use of a plurality of sensor elements, and select means for outputting a select signal for selecting the sensor elements. Each of the sensor elements is formed on a single crystal of a semiconductor or on a flat plate. Further, each of the sensor elements includes a passive device operable as a counter electrode coupled capacitively with the electrode to detect the potential variation in the electrode and generate a detect signal, and a transistor adapted to output the detect signal in response to the select signal.

In the above inspection apparatus, the sensor electrodes may be located around a position at which a counter electrode serving as one component of the liquid crystal panel is to be installed.

The liquid crystal panel may be a TFT liquid crystal panel comprising a thin-film transistor having a source electrode, drain electrode and gate electrode. In this case, the detect means is adapted to detect the potential variation in the drain electrode caused by applying the liquid crystal driving signal to the source and gate electrodes.

In addition, the transistor of each of the sensor elements may be a current-readout MOSFET having a source, drain and gate. In this case, the passive device is continuously formed with a diffusion layer served as the source, and the detect signal is obtained from the drain by inputting the select signal into the gate.

Alternatively, the transistor of each of the sensor elements may be a current-readout thin-film transistor having a source, drain and gate. In this case, the passive device is connected to the source, and the detect signal is obtained from the drain by inputting the select signal into the gate.

The transistor of each of the sensor elements may include a first MOSFET and a second MOSFET connected in series with each other. In this case, the passive device is connected to a gate of the first MOSFET, and the select signal is connected to a gate of the second MOSFET. A potential of a source of the first MOSFET is varied in response to the potential of the passive device applied to the gate of the first MOSFET Then, the varied potential is received by a drain of the second MOSFET, and the received potential is outputted from a source of the second MOSFET as the detect signal.

The transistor of each of the sensor elements may include a first thin-film transistor and a second first thin-film transistor connected in series with each other. In this case, the passive device is connected to a gate of the first thin-film transistor, and the select signal is connected to a gate of the second thin-film transistor. A potential of a source of the first thin-film transistor is varied in response to the potential of the passive device applied to the gate of the first thin-film transistor. Then, the varied potential is received by a drain of the second thin-film transistor, and the received potential is outputted from a source of the second thin-film transistor as the detect signal.

The transistor of each of the sensor elements may be a bipolar transistor having an emitter, collector and base. In this case, the passive device is connected to the emitter, and the detect signal is obtained from the collector by inputting the select signal to the base.

The transistor of each of the sensor elements may be a charge-readout MOSFET having a source, drain and gate. In this case, the passive device is formed continuously with a diffusion layer serving as the source. The select signal is inputted into the gate to lower a potential barrier formed below the gate so as to transfer a signal charge residing in the source to the drain as the detect signal, and the transferred detect signal is transferred by a charge-transfer device connected to the drain.

In this case, the inspection apparatus may further include a charge-supply MOSFET for supplying a charge to the passive device in response to the potential variation in the electrode to form a potential barrier so as not to cause the backflow of the supplied charge before completing the potential variation in the electrode. The charge-supply MOSFET has a drain formed continuously with the diffusion layer serving as the passive device.

In the inspection apparatus of the present invention, the sensor elements may be arranged in a matrix form.

The inspection apparatus of the present invention may further include a conductor plate in contact with the surface of the passive device.

Further, the inspection apparatus of the present invention may include shading means for preventing light from irradiating the semiconductor of each of the sensor elements.

In order to achieve the above object, according to the present invention, there is provided a method for inspecting a liquid crystal panel, in which a liquid crystal driving signal is applied to the board to cause a potential variation in an electrode of a board used in the liquid crystal panel, and the potential variation is detected in a non-contact manner by use of a plurality of sensor elements. In this method, each of the sensor elements is formed on a single crystal of a semiconductor or on a flat plate. Further, each of the sensor elements includes a passive device operable as a counter electrode coupled capacitively with the electrode to detect the potential variation in the electrode, and a transistor adapted to output a detect signal from the passive device.

BEST MODE FOR CARRYING OUT THE INVENTION

With reference to the drawings, preferred embodiments of the present invention will now be illustratively described in detail. However, it is intended that the scope of the present invention is not limited only to relative configurations of each component, numerical values and others described in these embodiments, unless they are defined by a specific description.

First Embodiment

A first embodiment of the present invention will be described in conjunction with one example of a system for inspecting a board used in a liquid crystal panel, in which an inspection unit 1 (hereinafter referred to as "FLASHSHOCK Sensor (FLASHSHOCK is a name of the registered trademark)") having a MOSFET as a sensor element is used.

Figure 1:
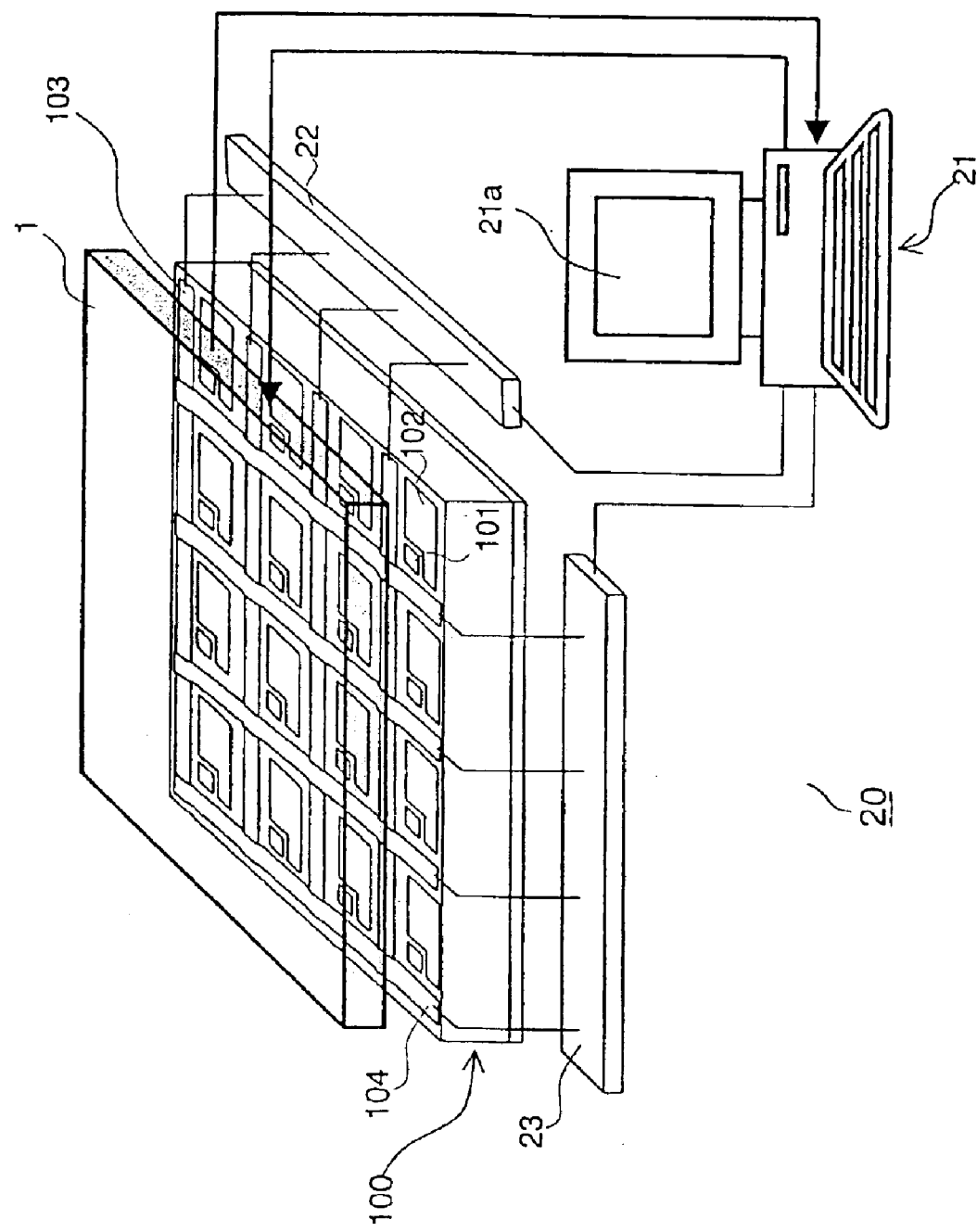
FIG. 1 is a schematic diagram of an inspection system using an inspection apparatus according to a first embodiment of the present invention.

FIG. 1 is a schematic diagram showing the state when a board used in a liquid crystal panel is inspected by using the FLASHSHOCK Sensor 1. In this embodiment, a TFT (Thin Film Transistor) panel as one example of the liquid crystal panel is inspected.

An inspection system 20 comprises the FLASHSHOCK Sensor 1 and a computer 21, as major components. A board 100 used in a liquid crystal panel includes a plurality of active devices 101, a plurality of liquid crystal driving electrodes 102, a plurality of X-electrodes 103, and a plurality of Y-electrodes 104. The board is provided with an X-electrode select section 22 for supplying a signal selectively to one of the X-electrodes 103, and a Y-electrode select section 23 for supplying a signal selectively to one of the Y-electrodes 104. The computer 21 can control the X-electrode select section 22 and the Y-electrode select section 23 to selectively drive one of a plurality of sets each composed of one of the active devices 101 and corresponding one of the liquid crystal driving electrodes 102.

The FLASHSHOCK Sensor 1 is located at a position opposed to the board 100 in a non-contact manner. The FLASHSHOCK Sensor 1 is adapted to detect a potential variation caused in the electrodes 101–104 (hereinafter referred to as "liquid crystal electrodes") on the board used in a liquid crystal panel according to the signals from the X-electrode select section 22 and the Y-electrode select section 23 and then output the detected potential variation to the computer 21 as a detect signal. The distance between the Flesh Shock Sensor 1 and the board 100 is desirable to be 0.05 mm or less. However, the potential variation can be detected by the distance of 0.5 mm or less. Further, the Flesh Shock Sensor 1 and the board 100 may be in tight contact with each other with interposing a dielectric insulating material therebetween.

The computer 21 supplies to the FLASHSHOCK Sensor 1 a synchronizing signal [including a vertical synchronizing signal (Vsync), a horizontal synchronizing signal (Hsync) and a reference signal (Dclk)] for allowing the FLASHSHOCK Sensor to be operated in synchronous with the control signals supplied to the X-electrode select section 22 and the Y-electrode select section 23. Further, the computer 21 applies a voltage sequentially to the liquid crystal electrodes provided in the board used in a liquid crystal panel to operate a plurality of sensor elements of the FLASHSHOCK Sensor 1 opposed to the liquid crystal electrodes. Then, the computer 21 receives a detect signal from the FLASHSHOCK Sensor 1 to create image data, and detects disconnection, short-circuit, chipping or the like in the liquid crystal electrodes based on the created image data.

Furthermore, the computer 21 has a function of indicating an image of the liquid crystal electrodes to be inspected on a display 21a based on the detect signal from each of the sensor elements.

FIG. 1 illustrates the board 100 and the FLASHSHOCK Sensor 1 as if they have the same size. However, the board 100 typically has a size several times larger than the FLASHSHOCK Sensor 1. In this case, the FLASHSHOCK Sensor 1 may be mechanically moved or provided in plural number to allow all of the liquid crystal electrodes in the board to be inspected. It is understood that the plurality of FLASHSHOCK Sensors 1 may be simultaneously moved to reduce the time for the inspection.

In an operation of assembling a liquid crystal panel, a liquid crystal is sandwiched between the board 100 and a counter electrode, and is driven by an electric field created between the liquid crystal driving electrodes 102 and the counter electrode. As in this embodiment, the FLASHSHOCK Sensor 1 allows the board 100 to be inspected under the same condition as that during actually assembling the liquid crystal panel. This make it possible to provide high reliability of the inspection and to inspect efficiently because any need for additionally processing the board 100 can be eliminated.

Figure 2:
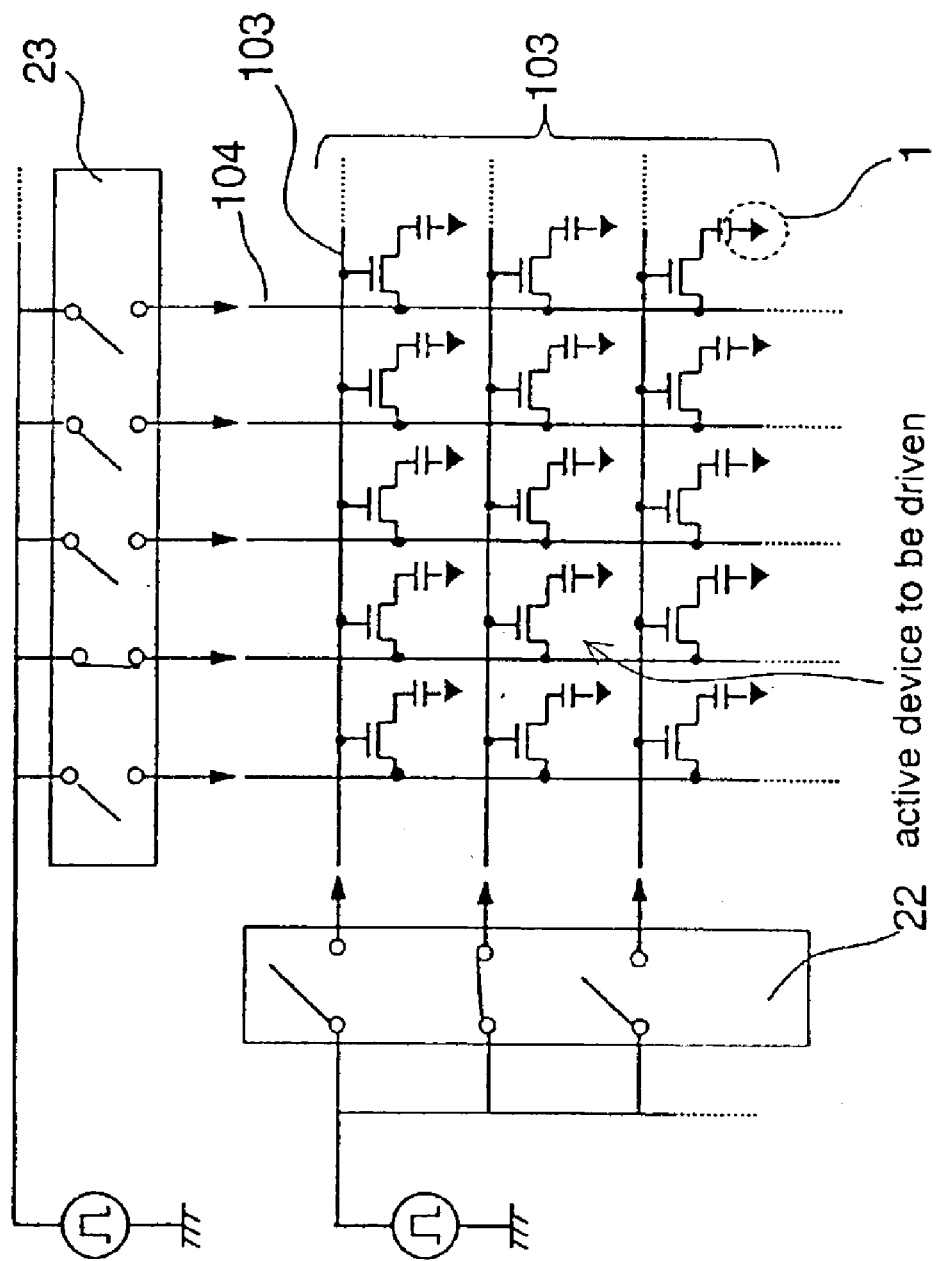
FIG. 2 is a circuit diagram of the inspection system according to the first embodiment of the present invention.
Figure 3:
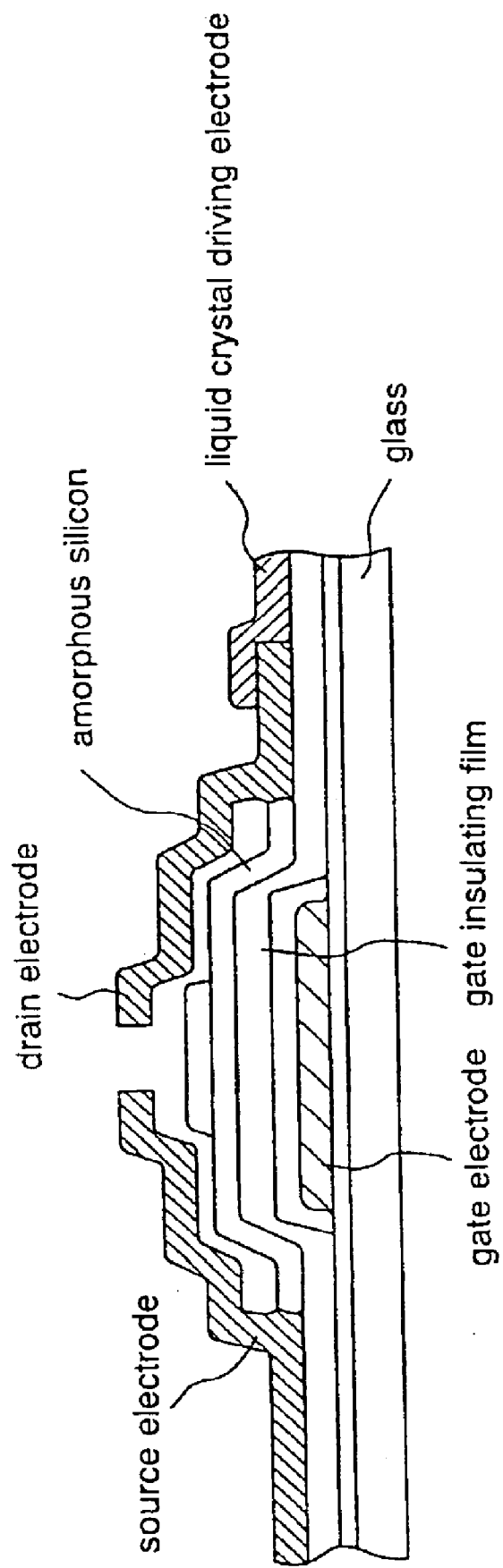
FIG. 3 is a sectional view of a board used in a TFT liquid crystal panel according to the first embodiment of the present invention.

FIG. 2 is a circuit diagram showing a circuitry of the board 100 used in a liquid crystal panel. Each of the active devices 101 is composed of a thin-film transistor including a source electrode, a gate electrode and a drain electrode. During the inspection, a capacitive coupling is mainly caused between the drain electrodes and the FLASHSHOCK Sensor 1, and this allows each potential variation in the drain electrodes to be detected. While FIG. 2 illustrates as if the capacitive coupling is caused only between the drain electrodes and the Sensor 1, the Sensor 1 is actually coupled capacitively with all of the liquid crystal electrodes. Thus, each shape of the source electrodes, the gate electrodes and the liquid crystal driving electrodes can also be detected as well as each shape of the drain electrodes. Since each of the active electrodes in this embodiment has a section as shown in FIG. 3, each image of the liquid crystal electrodes will be varied in sharpness according to the difference in the distance between each of the liquid crystal electrodes and the Sensor 1.

Figure 4:
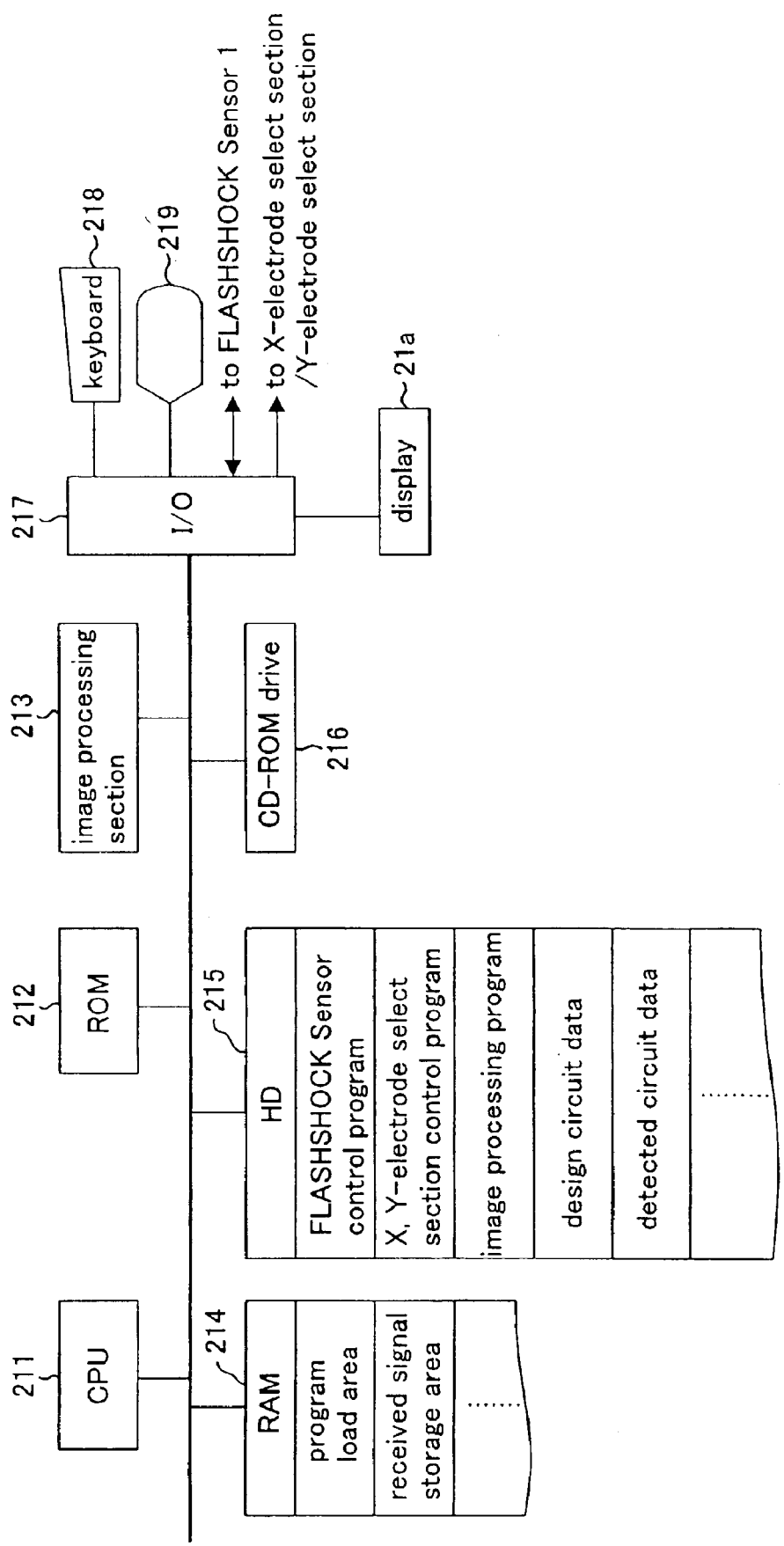
FIG. 4 is a block diagram showing an internal construction of a computer according to the first embodiment of the present invention.

With reference to FIG. 4, the internal construction of the computer 21 will be described. FIG. 4 is a schematic block diagram showing the hardware of the computer 21.

The reference numeral 211 indicates an arithmetic and control CPU for controlling the entire computer 21. The reference numeral 212 indicates a ROM for storing fixed values and various programs executed on the CPU 211. The reference numeral 213 indicates an image processing section for processing inputted digital data to create image data and then outputting an image on a display 21a. The reference numeral 214 indicates a RAM as a temporary memory including a program load area for storing the programs to be loaded and a storage area for storing digital signals received from the FLASHSHOCK Sensor. The received digital signals are stored separately for each group of the sensor elements corresponding to each shape of the liquid crystal electrodes.

The reference numeral 215 indicates a hard disk (HD) as an external memory device. The reference numeral 216 indicates a CD-ROM drive as a read device for a detachable recording medium.

The reference numeral 217 indicates an input/output interface through which various signals are given to and received from a keyboard 218 and/or mouse 219 as an input device, and the FLASHSHOCK Sensor 1 and/or the X and Y-electrode select sections 22, 23.

The HD 215 stores various programs, such as a FLASHSHOCK Sensor control program, an X, Y-electrode select section control program and an image processing program, and these programs will be loaded on the program load area of the RAM 214 and executed on the CPU. The HD 215 also stores image data representing each shape of the liquid crystal electrodes inspected by the FLASHSHOCK Sensor 1 and design image data representing each design shape of the liquid crystal electrodes. According to the image processing program, each actually detected shape of the liquid crystal electrodes is compared with each corresponding design shape of the liquid crystal electrodes to determine the presence of defects.

In order to determine the presence of defects, the image data inputted from the FLASHSHOCK Sensor 1 may be stored by the group of the sensor elements opposed to each shape of the liquid crystal electrodes, or by one frame of all of the sensor elements.

The FLASHSHOCK Sensor control program, the X, Y-electrode select section control program, the image processing program, and the design image data representing each design shape of the liquid crystal electrodes may be installed by reading a CD-ROM as the detachable recording medium through the use of the CD-ROM drive, or by reading another medium such as a FD or DVD, or by downloading via networks.

Figure 5:
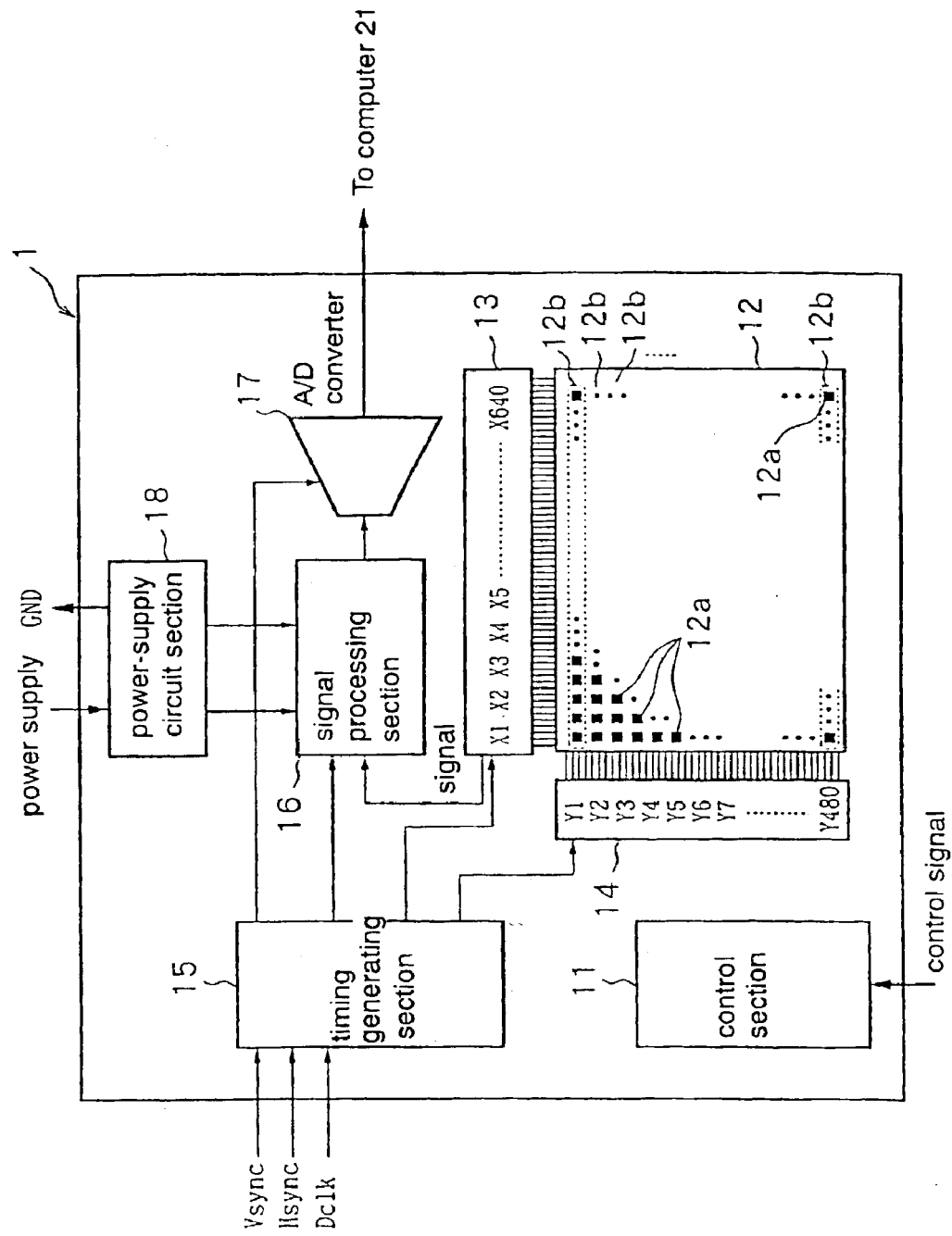
FIG. 5 is a block diagram showing an electric construction of a FLASHSHOCK Sensor according to the first embodiment of the present invention.

FIG. 5 is a block diagram showing the electric construction of the FLASHSHOCK Sensor 1.

The FLASHSHOCK Sensor 1 is mounted on a package (not shown) with the electric construction as shown in this figure.

The FLASHSHOCK Sensor 1 comprises a control section 11, a sensor element set 12 composed of the plurality of sensor elements 12a, a vertical select section 14 for selecting sensor element lines 12b each composed of the given number of horizontally aligned sensor elements, a lateral select section 13 for picking up signals from the sensor elements 12a, a timing generating section 15 for generating a select signal for selecting the sensor element lines 12b, a signal processing section 16 for processing signals from the lateral select section 13, an A/D converter 17 for A/D converting signals from the signal processing section 16, and a power supply circuit section 18 for supplying electric power for driving the FLASHSHOCK Sensor 1.

The control section 11 is adapted to control the operation of the FLASHSHOCK Sensor 1 according to the control signal from the computer 21. The control section 11 includes a control register to set the operation timing, amplification and reference voltage of the Sensor, and the range or area of the sensor elements to be inspected. In case of simultaneously using the plural number of the FLASHSHOCK Sensors, the control section may set sensor select numbers to allow each of the FLASHSHOCK Sensors to be distinguished by the host CPU.

The sensor elements 12a are arranged in a matrix form (480 elements for each column×640 elements for each row), and each of the sensor elements 12a detects in a non-contact manner each potential variation in the liquid crystal electrodes 101 in response to an inspection signal supplied to the liquid crystal electrodes circuit 101.

The timing generating section 15 is supplied with the vertical synchronizing signal (Vsync), the horizontal synchronizing signal (Hsync) and the digital clock signal (Dclk)

from the computer 21 to supply a timing signal for selecting the sensor elements 12a to the vertical select section 14, the lateral select section 13, the signal processing section 16 and the A/D converter 17.

The vertical select section 14 selects at least either one of the rows of the sensor element sets 12 sequentially according to the timing signal from the timing generating section 15. All of the detect signals from the sensor elements 12a in the sensor element line 12b selected by the vertical select section 14 are outputted at once and are inputted into the lateral select section 13. The lateral select section 13 amplifies the analog detect signals from 640 pieces of terminals, and then temporarily holds the amplified detect signals. Then, the lateral select section 13 outputs the analog detect signals sequentially to the signal processing section 16 in response to the timing signal generated by a selecting circuit composed of a multiplexer or the like in the timing generating section 15.

The signal processing section 16 further amplifies the signals from the lateral select section 13 to the level required for a determination processing, and subjects the signals to an analog signal conditioning such as filtering for canceling noise, followed by transferring the processed signals to the A/D converter 17. The signal processing section 16 also includes an automatic gain control for automatically optimizing the voltage amplification factor for the readout signals of the Sensor.

The A/D converter 17 converts the analog detect signals from the signal processing section 16 into digital signals, for example, of 8-bit, and then outputs the resulting digital signals.

The power supply circuit 18 generates a reference clamp voltage for the signal processing section or the like.

While the A/D converter 17 herein is incorporated into the FLASHSHOCK Sensor 1, the analog signals subjected to the analog signal conditioning in the signal processing section may be outputted directly to the computer 21.

Figure 6:
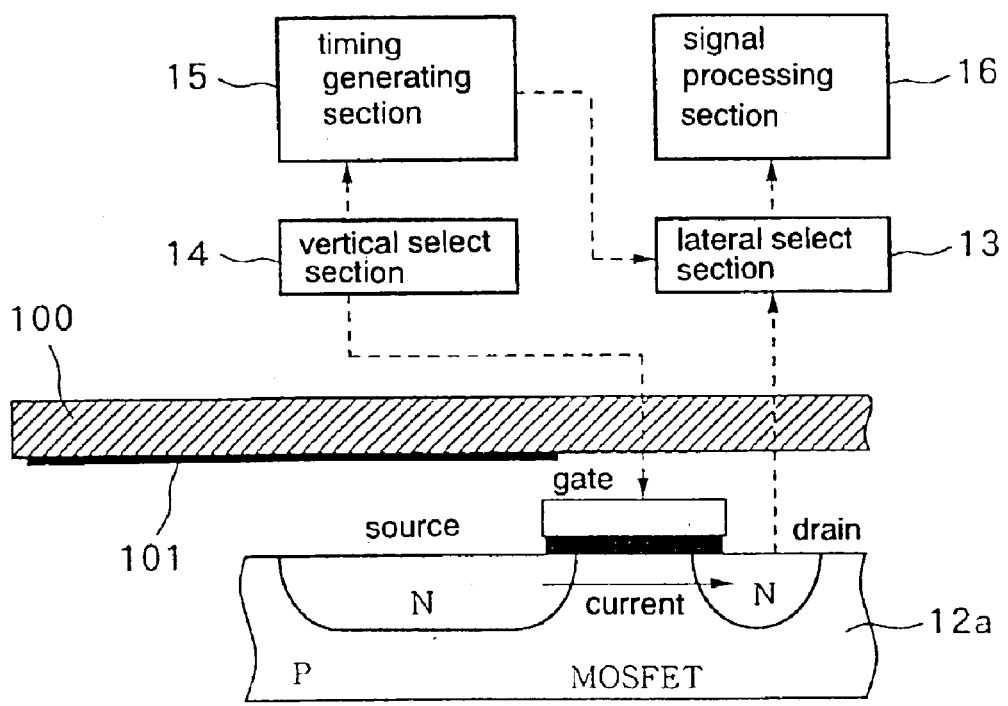
FIG. 6 is a detailed explanatory diagram of a sensor element according to the first embodiment of the present invention.

The operation of the sensor elements 12a will be described below. FIG. 6 is an explanatory block diagram of one of the sensor elements 12a.

The illustrated sensor element 12a is a MOS field effect transistor (MOSFET), in which one of diffusion layers is formed to have a lager surface area than that of the other diffusion layer. The diffusion layer having the larger surface area serves as a passive device. The passive device is positioned opposed to one of the liquid crystal electrodes 101, and is formed continuously with a source of the MOSFET. The MOSFET also has a gate connected to the vertical select section 14, and a drain connected to the lateral select section 13. The diffusion layer serving as the passive device is also provided with a potential barrier for discharging a surplus charge.

When the sensor element 12a is selected by the timing generating section 15 through the vertical select section 14, a signal is transmitted from the vertical select section 14 to the gate to turn on the sensor element 12a (i.e. to bring the sensor element 12a into a state ready to output the detect signal).

At this moment, when a given voltage as an inspection signal is applied to the liquid crystal electrode 101, the potential of the liquid crystal electrode 101 is varied. As a result, a current flows from the source to the drain. This current serves as the detect signal which is transmitted to the signal processing section 16 through the lateral select section 13. If no liquid crystal electrode 101 is located at the position opposed to the sensor element 12a, no current will flow.

Thus, the position of the liquid crystal electrode 101 in the board 100 can be determined by analyzing the position of the sensor element 12a having the output current as the detect signal.

Figure 7:
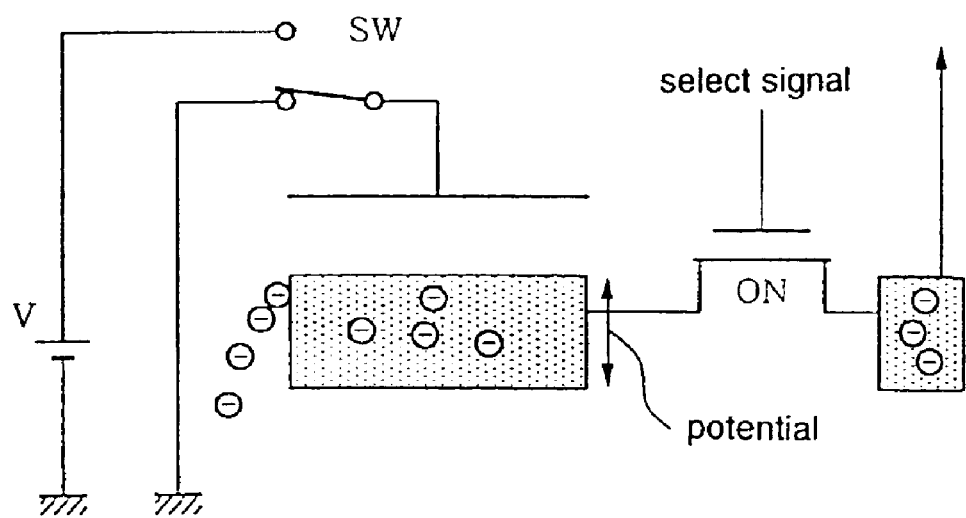
FIG. 7 is an explanatory model diagram of a principle on which a current in the sensor element according to the first embodiment of the present invention is generated in response to a potential variation in a liquid crystal electrode.
Figure 8:
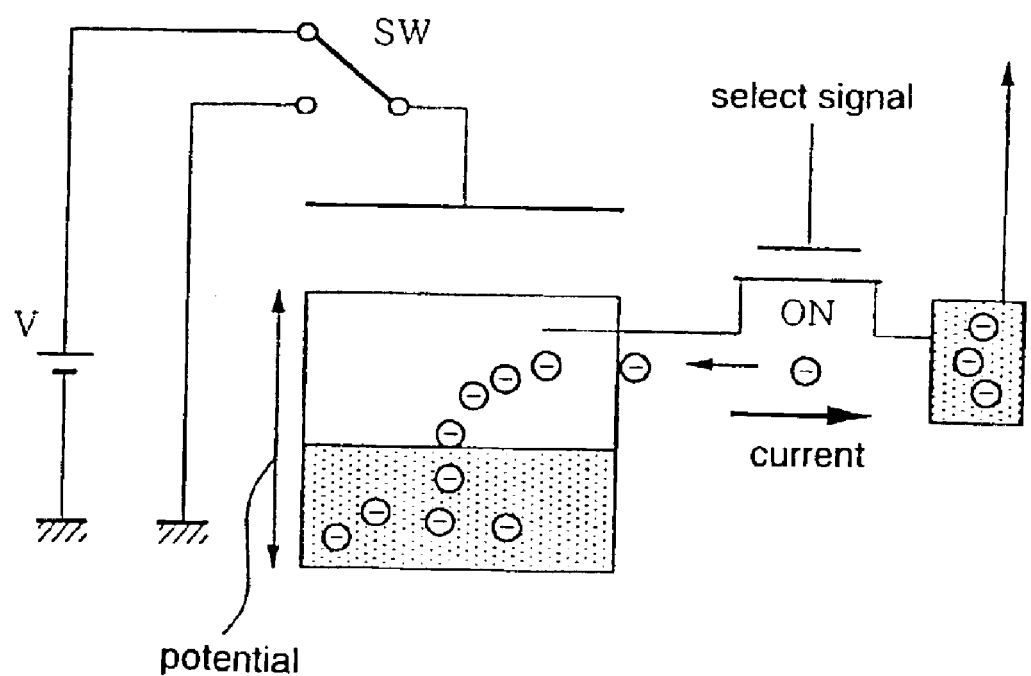
FIG. 8 is an explanatory model diagram of a principle on which a current in the sensor element according to the first embodiment of the present invention is generated in response to a potential variation in a liquid crystal electrode.

A principle on which a current flows from the source to the drain will be described in detail below. FIGS. 7 and 8 are schematic explanatory model diagrams of this principle. FIG. 7 shows the state when no voltage is applied to the liquid crystal electrode, and FIG. 8 shows the state when a given voltage is applied to the liquid crystal electrode. In both of these figures, the gate is turned on by inputting the select signal into the gate.

As shown in FIG. 7, if no voltage is applied to the liquid crystal electrode, a surplus charge in the diffusion layer flows over from a turned-off discharge potential barrier having a lower potential than that of a potential barrier below the gate. In this case, the potential of the source is defined by the potential of the discharge potential barrier.

As shown in FIG. 8, when a voltage V is applied to the liquid crystal electrode, the liquid crystal electrode is positively charged (at a potential V). Since the liquid crystal electrode and the source-side diffusion layer are located with leaving a small distance therebetween. Thus, the source-side diffusion layer opposed to the liquid crystal electrode comes under the influence of the potential variation in the liquid crystal electrode to have the potential V, and thereby a charge flows into the source-side diffusion layer. More specifically, the source-side diffusion layer operates as if the liquid crystal electrode and the source-side diffusion layer were capacitively coupled with each other, so that the potential at the source-side diffusion layer is lowered to allow electrons to flow into the source-side diffusion layer or allow a current to flow from the source to the drain.

When the liquid crystal electrode is connected to the ground again, the source-side diffusion layer gets back into the original potential, and thereby surplus electrons are released gradually from the discharge potential barrier.

Figure 9:
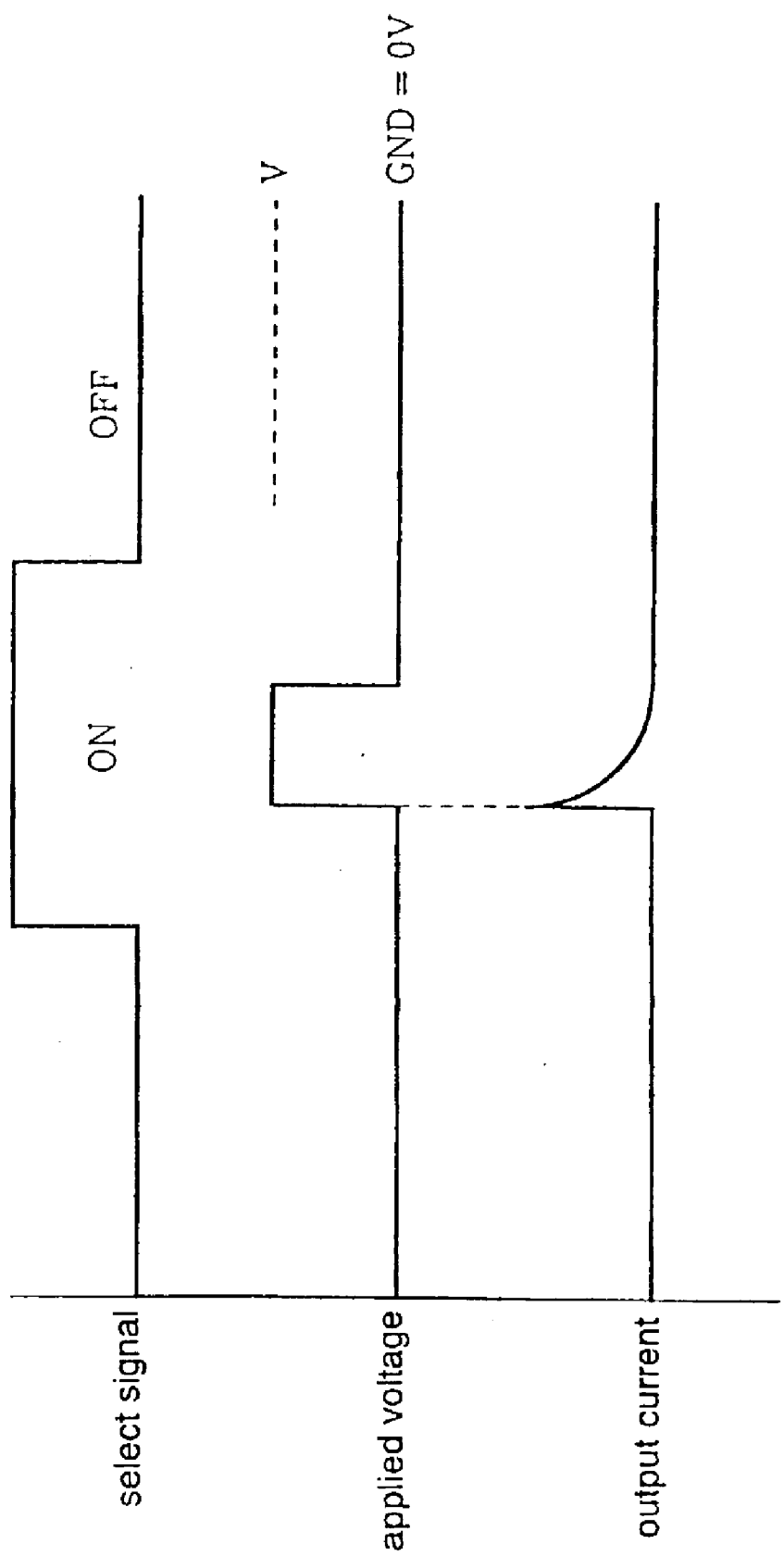
FIG. 9 is a timing chart showing input/output timings of the sensor element according to the first embodiment of the present invention.

FIG. 9 is a timing chart showing input/output timings in the case of using a MOSFET as shown in FIG. 6.

As is shown in FIG. 9, an output current is obtained by applying a voltage to the liquid crystal electrode. The current exhibits its peak just after the voltage is applied and then the current exponentially decrease. Thus, the lateral select section 13 detects the current in response to the timing of applying the voltage and holds the current value.

As described above, the sensor elements are formed on a single crystal of a semiconductor. Further, each of the sensor elements includes a passive device operable as a counter electrode coupled capacitively with the liquid crystal electrode to detect the potential variation in the liquid crystal electrode and an MOS transistor formed continuously with the passive device and adapted to output a current as a detect signal from the passive device when the select signal is inputted into the gate of the transistor. Thus, the sensor elements can be superfinely manufactured.

In other words, since the sensor element unit can be manufactured by use of currently established transistor manufacturing technologies as it is, not only each of the sensor elements itself but also each distance between the sensor elements can be superfinely formed. This allows each shape of the liquid crystal electrodes printed on a board used in a liquid crystal panel to be imaged or displayed with a high degree of resolution, which provides accurate detection of chippings or the like in the liquid crystal electrodes. Further, any need for preparing particular manufacturing apparatuses to manufacture the sensor element unit can be eliminated. This provides an effect of achieving remarkably enhanced productivity.

A subject to be inspected or a board used in a liquid crystal panel is not limited to a board used in a TFT liquid crystal panel, and a board of the present invention may be used in any other liquid crystal panel, such as an STN (Super Twisted Nematic) liquid crystal panel or an MIM (Metal Insulator Metal) liquid crystal panel. Further, the FLASHSHOCK Sensor may be applied to an inspection of a board used in a plasma display panel.

As shown in FIG. 5, the sensor elements 12a are preferably uniform in shape, because this allows signals appearing in the liquid crystal electrodes to be received by each of the sensor element 12a without any deviation.

Further, as shown in FIG. 5, the sensor elements 12a is preferably arranged in a matrix form in which the sensor elements 12a are arranged at even intervals respectively in row and column directions. This arrangement makes it possible not only to reduce the unevenness in the number of the sensor elements 12a per a unit area opposed to the liquid crystal electrodes but also to clarify the relative physical relationship between respective sensor elements 12a so as to facilitate determining each shape of the liquid crystal electrodes based on the detect signals. However, only a single line of the sensor elements 12a may be arranged depending on the shape of the liquid crystal electrode to be inspected.

While the FLASHSHOCK Sensor 1 has the arrangement of 480 rows and 640 columns, this arrangement has been selected only to simplify the description of this embodiment. Practically, the sensor elements ranging from 200,000 to 2,000,000 pieces may be arranged in 5 to 50 μm square. In order to achieve an inspection with higher accuracy, each size of the sensor elements 12a and each distance between adjacent sensor elements 12a are preferably set depending on the line width of the liquid crystal electrode.

While this embodiment employs an N-channel MOSFET as each of the sensor elements, the present invention is not limited only to this embodiment, and a P-channel MOSFET may be used.

While an n-type diffusion layer is used as the passive device in FIG. 6, any other suitable material having relatively high conductivity, including amorphous semiconductors having such conductivity, may be used.

Figure 10:
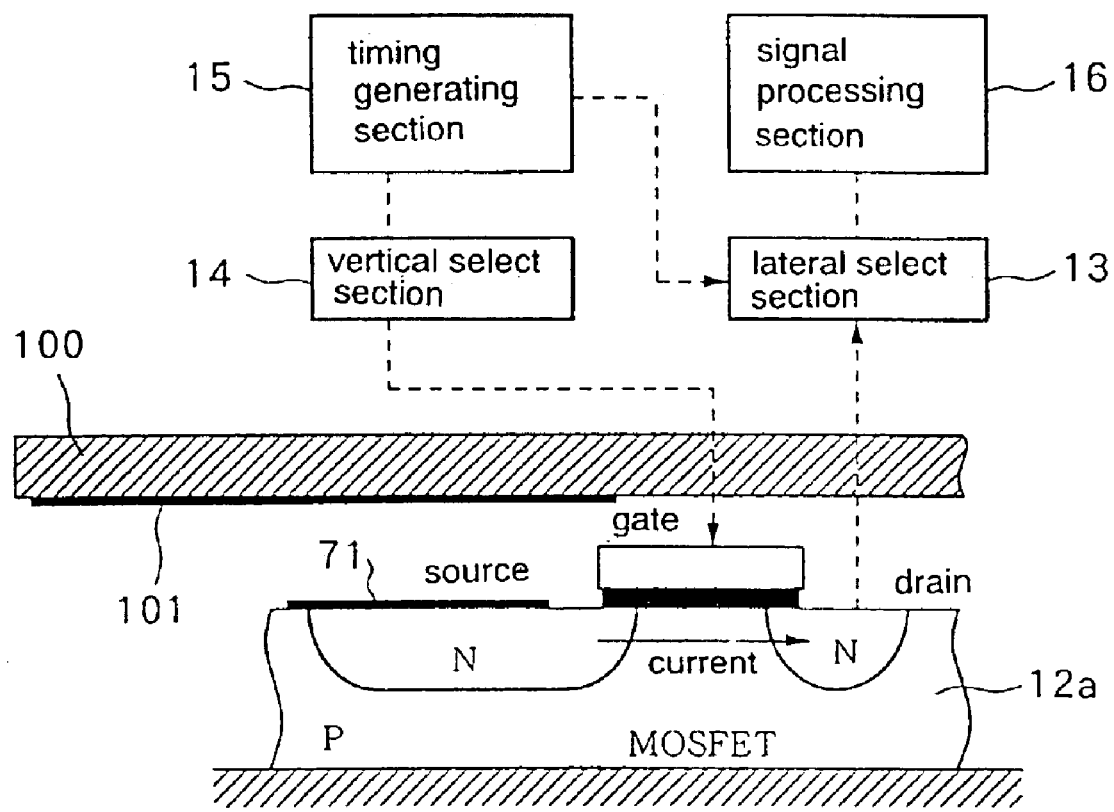
FIG. 10 is a block diagram showing an alternative example of the sensor element according to the first embodiment of the present invention.

Furthermore, as shown in FIG. 10, a conductor plate 71 may be provided on the source-side diffusion layer serving as the passive device to define an ohmic contact thereto. This provides increased conductivity of the surface of the passive device, or allows signal charges to be concentrated in the vicinity of the surface of the passive device with high density thereof, so as to achieve stronger capacitive coupling. The conductor plate 71 may be formed of either a metallic thin film or a polycrystalline semiconductor.

Second Embodiment

With reference to FIGS. 11 to 15, another FLASHSHOCK Sensor as a second embodiment of the present invention will be described below.

The FLASHSHOCK Sensor of this embodiment is different from that of the first embodiment in that this embodiment employs a charge-voltage conversion circuit in which a diffusion layer of a semiconductor serves as sensor elements for receiving signals from liquid crystal electrodes. Since other components are similar to those of the first embodiment, the description about them will be omitted herein and the same components as those of the first embodiment will be defined by the same reference numerals in the drawings.

Figure 11:
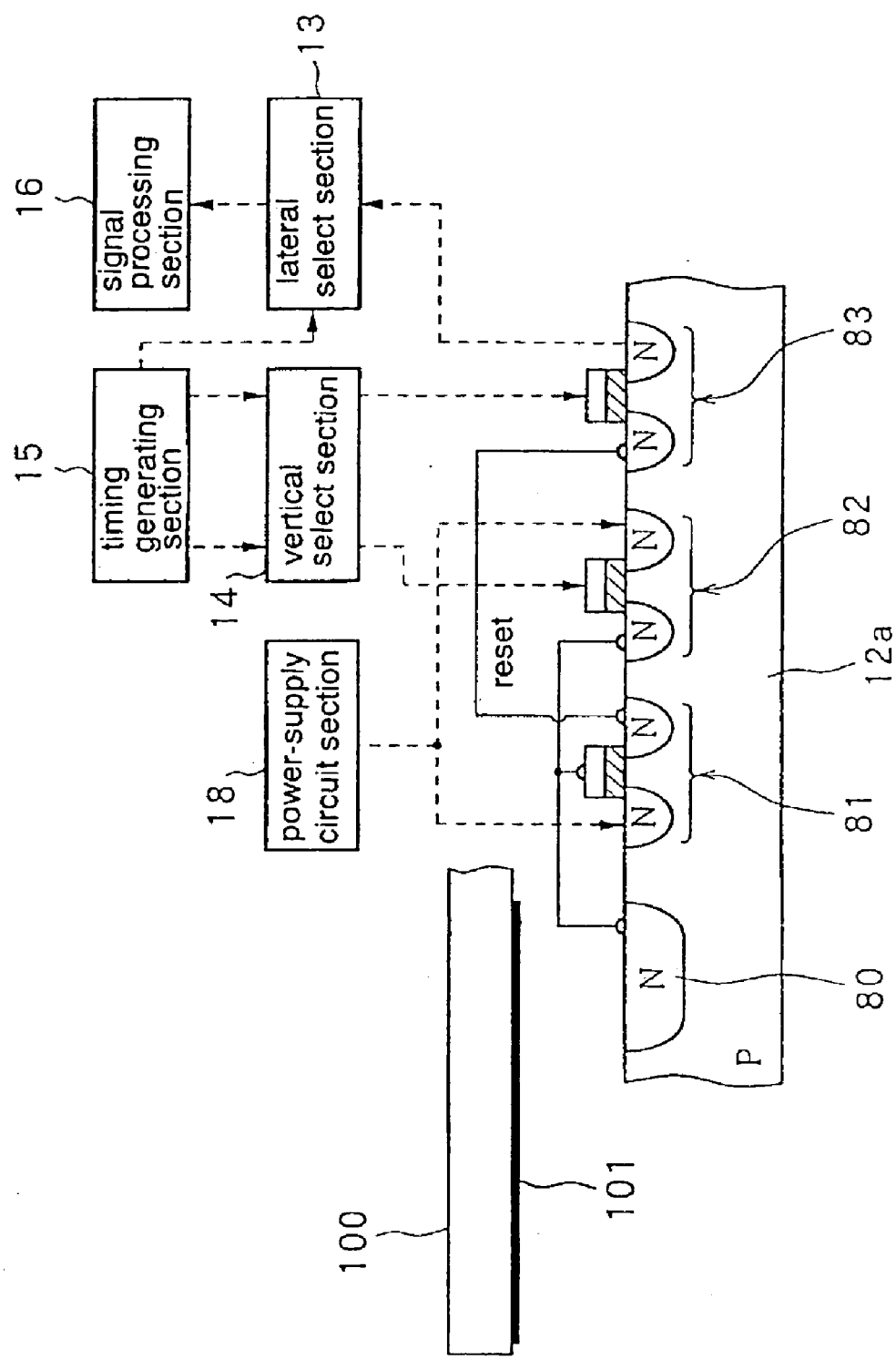
FIG. 11 is an explanatory block diagram of a sensor element according to a second embodiment of the present invention.

FIG. 11 is an explanatory block diagram of one of sensor elements 12a according to this embodiment. As with the sensor element according to the first embodiment, the sensor element 12a according to this embodiment includes a diffusion layer having a relatively large surface area as a passive device 80. The passive device 80 is connected to a gate of a MOSFET 81 and a source of a MOSFET 82. A voltage VDD from a power-source circuit section 18 is applied to a drain of the MOSFET 81, and a source of the MOSFET 81 is connected to a drain of an MOSFET 83. A reset signal from a vertical select section 14 is inputted into a gate of the MOSFET 82, and the voltage VDD from the power-source circuit section 18 is applied to a drain of the MOSFET 82. A select signal from the vertical select section 14 is inputted into a gate of the MOSFET 83, and an output from a source of the MOSFET 83 is inputted into a lateral select section 13.

Figure 12:
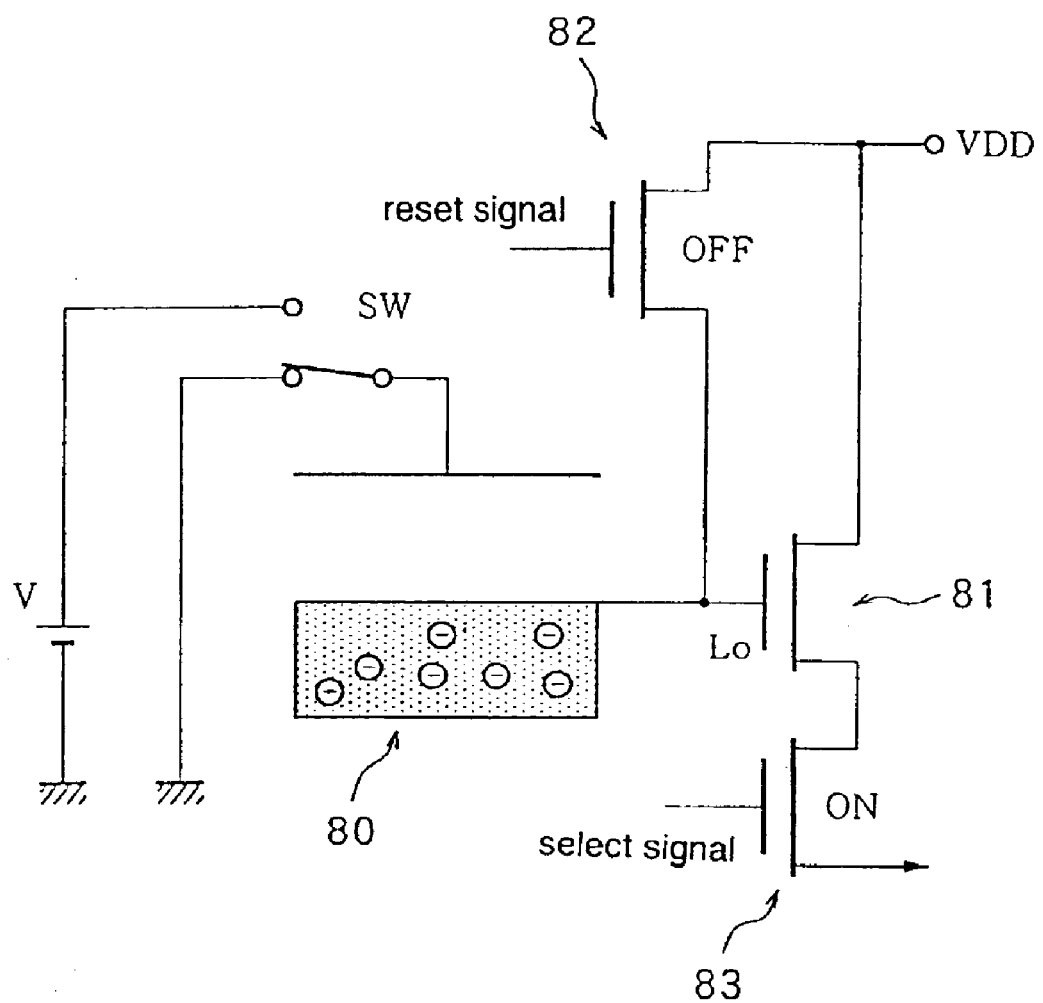
FIG. 12 is an explanatory model diagram of a principle on which a voltage in the sensor element according to the second embodiment of the present invention is generated in response to a potential variation in a liquid crystal electrode.
Figure 13:
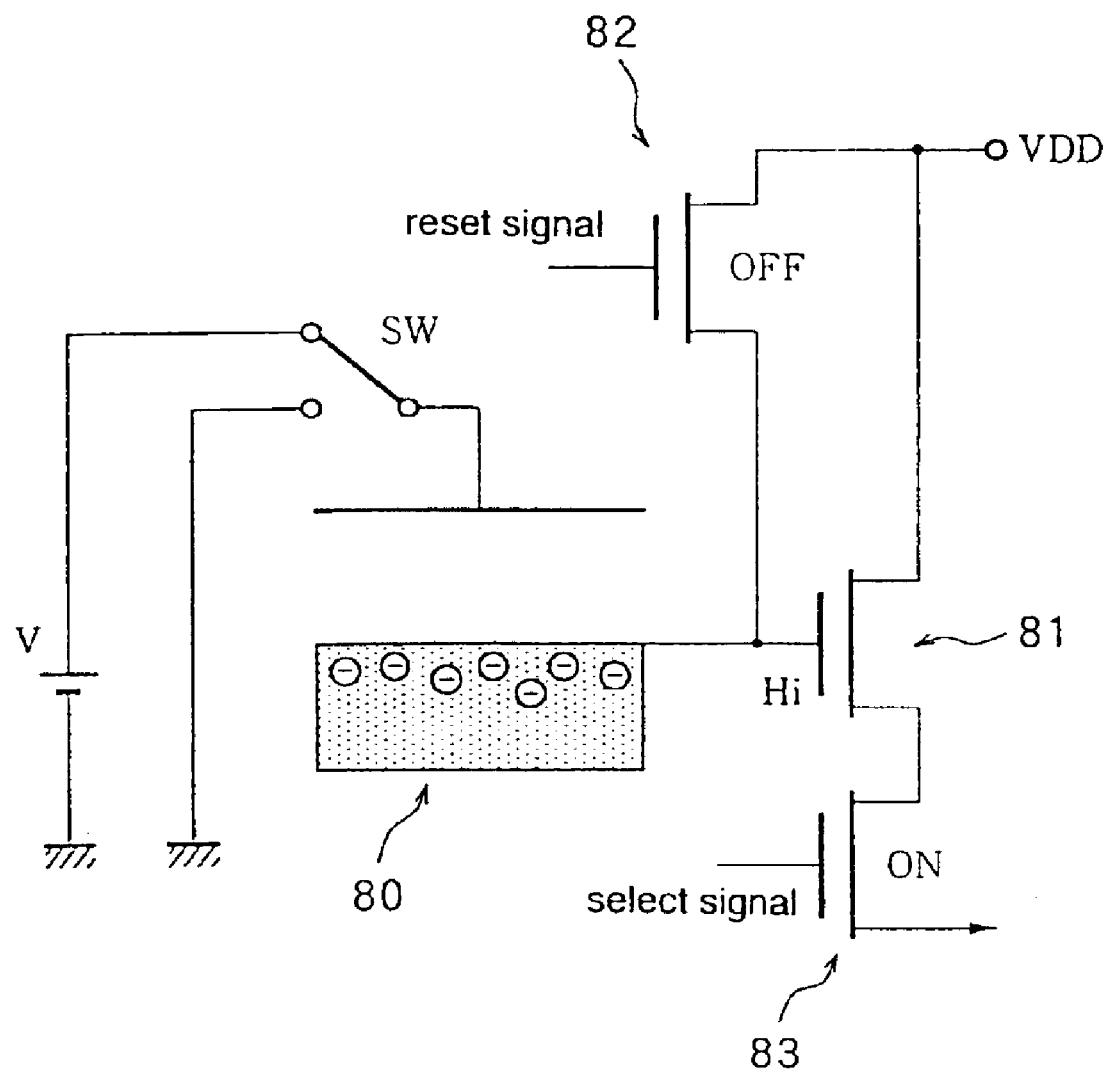
FIG. 13 is an explanatory model diagram of a principle on which a voltage in the sensor element according to the second embodiment of the present invention is generated in response to a potential variation in a liquid crystal electrode.

A principle on which a potential variation in the liquid crystal electrode 101 detected by the passive device 80 is converted into an output voltage to be outputted from the source of the MOSFET 83 will be described in detail below. FIGS. 12 and 13 are schematic explanatory model diagrams of this principle. FIG. 12 shows the state when no voltage is applied to the liquid crystal electrode, and FIG. 10 shows the state when a given voltage is applied to the liquid crystal electrode. In both of these figures, the gate of the MOSFET 83 is turned on by inputting the select signal into this gate.

As shown in FIG. 12, if no voltage is applied to the liquid crystal electrode, electrons in the passive device 80 are confined within a potential well of the diffusion layer, and thereby a voltage Lo is applied to the gate of the MOSFET 81. Thus, a potential lower than that of the gate of the MOSFET 81 by a threshold voltage of the MOSFET 81 is outputted to the source of the MOSFET 81 performing a source follower operation.

As shown in FIG. 13, when a voltage V is then applied to the liquid crystal electrode, the passive device 80 opposed to the liquid crystal electrode comes under the influence of the potential variation in the liquid crystal electrode, and thereby electrons tend to gather on the surface of the passive device 80. However, since no electron flows additionally into the passive device 80, the originally existing electrons are concentrated near the surface of the passive device 80. This provides surface potential drop, i.e. increased potential, in the passive device 80. Since the gate of the MOSFET 81 is connected to the surface of the passive device 80, a higher voltage Hi is applied to the gate of the MOSFET 81. As a result, even though a potential lower than that of the gate of the MOSFET 81 by the threshold voltage of the MOSFET 81 is outputted to the source of the MOSFET 81 performing a source follower operation, a higher voltage than that in case of applying no voltage to the liquid crystal electrode will be outputted to the source of the MOSFET 81.

When the liquid crystal electrode is connected to the ground again, the electrons in the passive device 80 are dispersed again, and the potential at the gate of the MOSFET 81 is reduced down to Lo.

Figure 14:
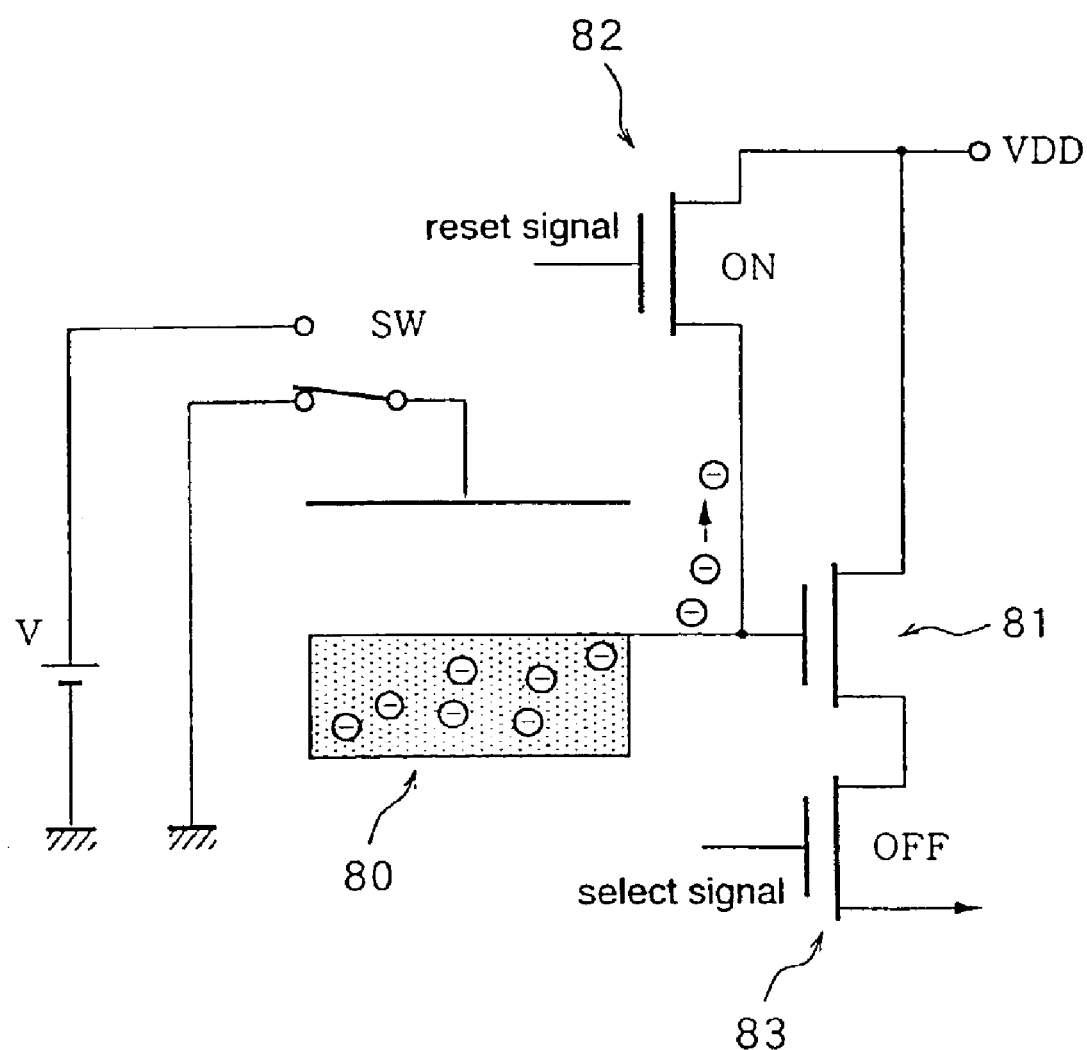
FIG. 14 is an explanatory model diagram of an operation at the time when a reset signal is inputted into the sensor element according to the second embodiment of the present invention.

As above, theoretically, the entire amount of charges in the passive device 80 is not varied only by on-off switching the voltage to the liquid crystal electrode. However, in practice, some electrons occasionally intrude in the passive device 80 from its surroundings. If such a situation is left as it is, the potential of the passive device will go up without any voltage applied to the liquid crystal electrode, and the potential difference or voltage of the passive device will be lowered. This means that the noise potential caused by the above noise electrons is superposed as an offset potential on a receive signal from the liquid crystal electrode and thereby the received signal is varied with time. From this point, as shown in FIG. 14, a reset signal is inputted into the gate of the MOSFET 82 to electrically connect the passive device 80 with the power source. Thus, surplus electrons in the passive device 80 can be released to keep the potential of the passive device 80 constant.

Figure 15:
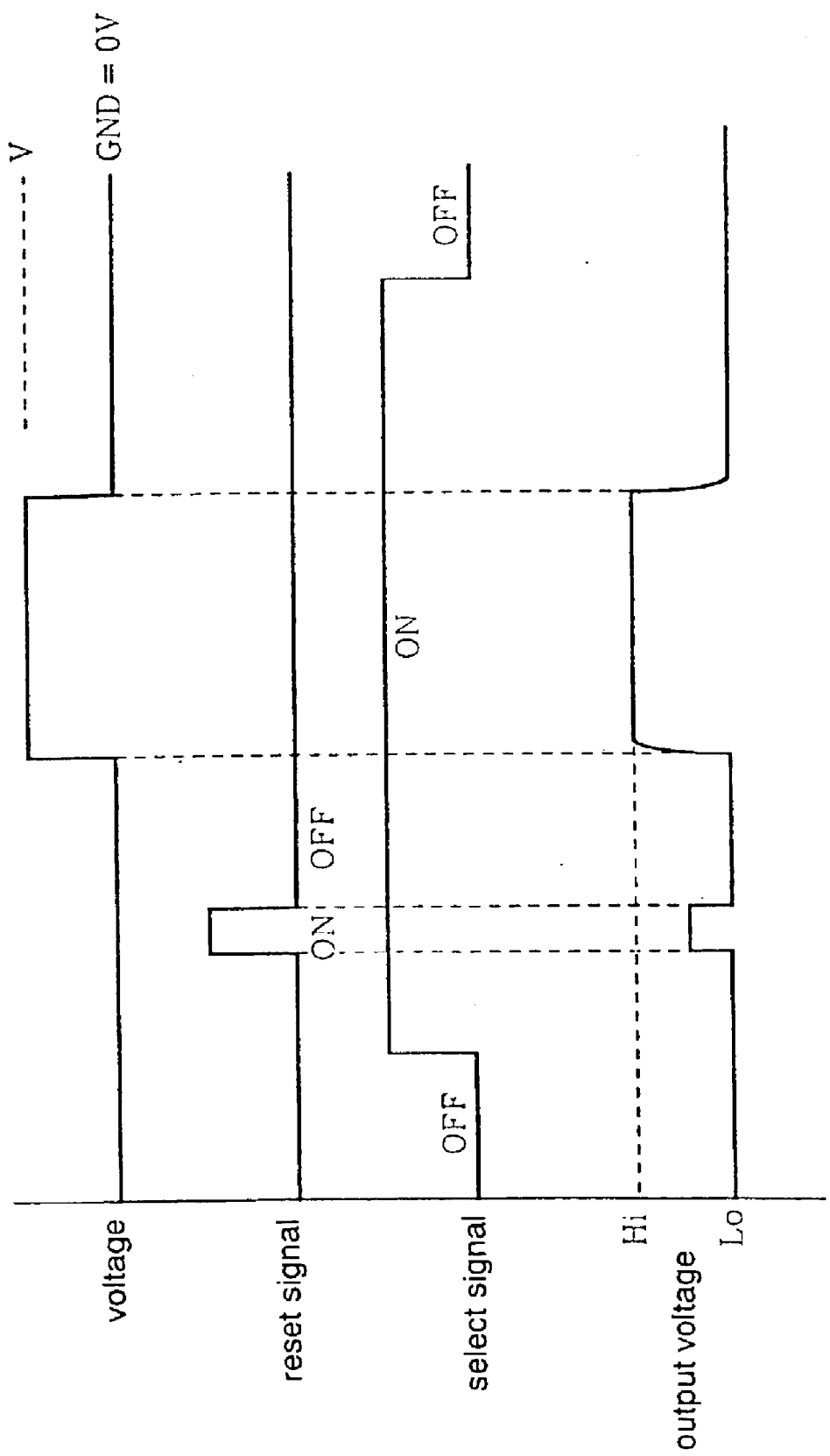
FIG. 15 is a timing chart showing input/output timings of the sensor element according to the second embodiment of the present invention.

FIG. 15 is a timing chart showing input/output timings in case of using the MOSFET circuit as shown in FIG. 11.

As shown in FIG. 15, a select signal is turned on, and then a reset signal is turned on for a given time period to suppress the temporal variation in the potential of the passive device 80. At this time, the potential at the gate of the MOSFET 81 is increased and the output voltage from the drain of the MOSFET 83 is slightly increased. This is referred to as a coupling noise of the reset signal. After turning off the reset signal, a voltage V is applied to the liquid crystal electrode. When this voltage is applied to the liquid crystal electrode, the output voltage from the drain of the MOSFET 83 becomes the voltage Hi. Based on this, it may be recognized that the liquid crystal electrode is located at the position opposed to the sensor element 12a.

In order not to detect the coupling noise erroneously for the output voltage, the timing for detecting the output voltage is suitably adjusted or the output voltage is passed through a high-pass filter.

As above, the sensor element composed of the charge-voltage conversion circuit as shown in FIG. 11 allows the detect signal to be picked up in the form of an amplified voltage. Thus, the detect signal can be clearly identified, and thereby the board used in a liquid crystal panel can be inspected with a higher degree of accuracy.

The input timing of the reset signal is not limited to the timing shown in FIG. 15, and any other suitable timing may be used.

Further, while the passive device 80 is formed in an n-type diffusion layer in FIG. 8, the present invention is not limited to this embodiment, and any other suitable material having relatively high conductivity, including metallic thin films, polycrystalline semiconductors or amorphous semiconductors having such conductivity, may be used.

Third Embodiment

Figure 16:
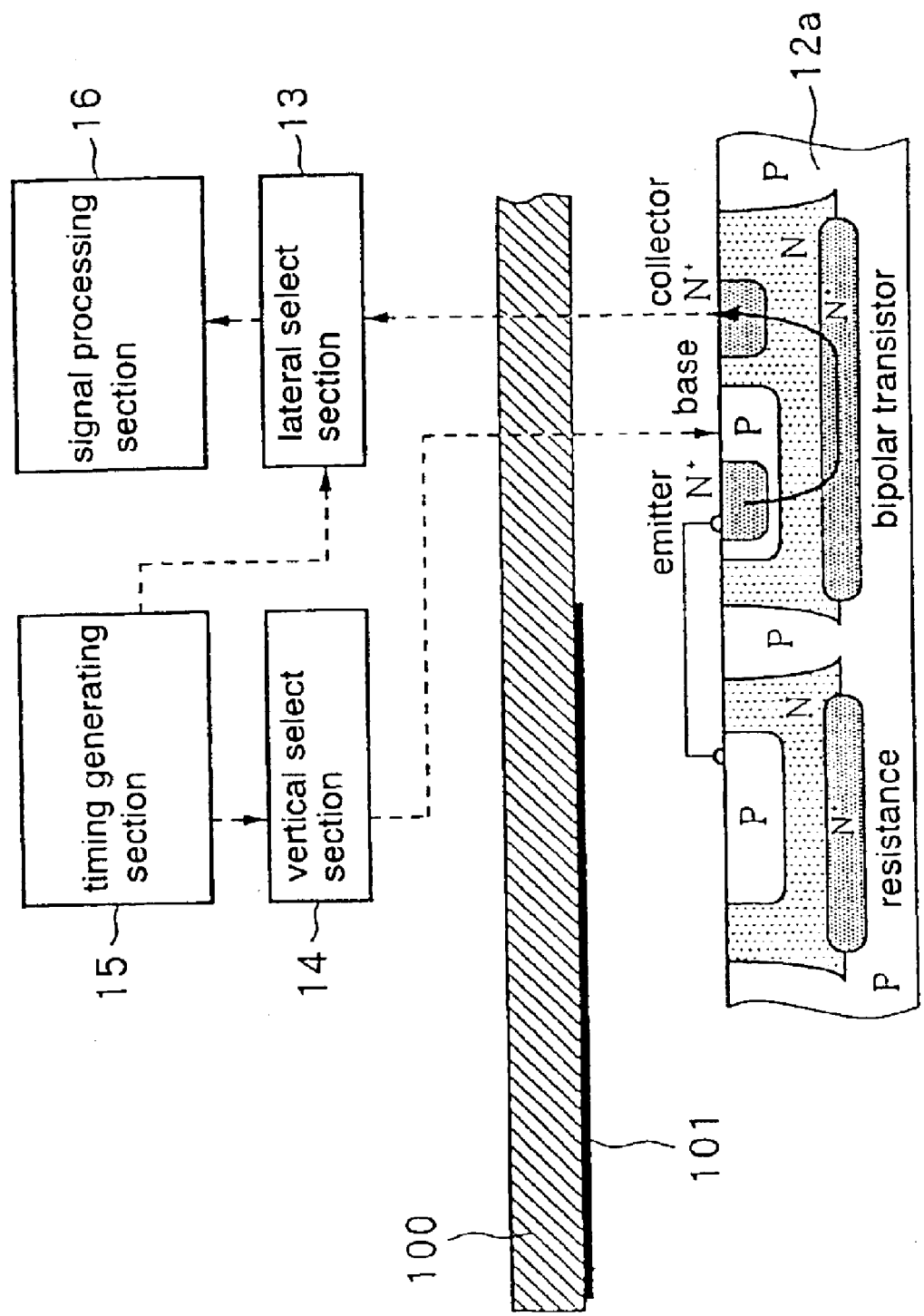
FIG. 16 is an explanatory block diagram of a sensor element according to a third embodiment of the present invention.

With reference to FIG. 16, another FLASHSHOCK Sensor as a third embodiment of the present invention will be described below.

The Flash Sock Sensor of this embodiment is different from that of the first embodiment in that this embodiment employs a bipolar transistor as the sensor element. Since other components are similar to those of the first embodiment, the description about them will be omitted herein and the same components as those of the first embodiment will be defined by the same reference numerals in this figure.

FIG. 16 is an explanatory block diagram of one of sensor elements according to this embodiment.

A passive device for detecting the potential variation in the liquid crystal electrode is composed of a resistive device, and an emitter of the bipolar transistor is connected to the resistive device. A select signal from a vertical select section 14 is input into a base of the bipolar transistor, and an output current outputted from a collector of the bipolar transistor as the detect signal is inputted into a signal processing section 16 through a lateral select section 13.

The operation of the sensor element 12a is almost similar to that of the MOSFET described in FIGS. 7 and 8. When a select signal is applied to the base of the bipolar transistor, an N+diffusion layer serving as the emitter of the bipolar transistor and another N+diffusion layer serving as the collector of the bipolar transistor are conducted each other. Then, when the potential at the liquid crystal electrode is increased and thereby electrons are concentrated on a P diffusion layer of the resistive device, a current is outputted from the collector. This current is amplified at the lateral select section 13, and then is inputted into the signal processing section 16 in response to a timing signal generated by a timing generating section 15.

The bipolar transistor as the sensor element allows the detect signal to be outputted at a high speed and with high accuracy.

While the NPN bipolar transistor is used in this embodiment, it is understood that a PNP bipolar transistor may be used.

Forth Embodiment

Figure 17:
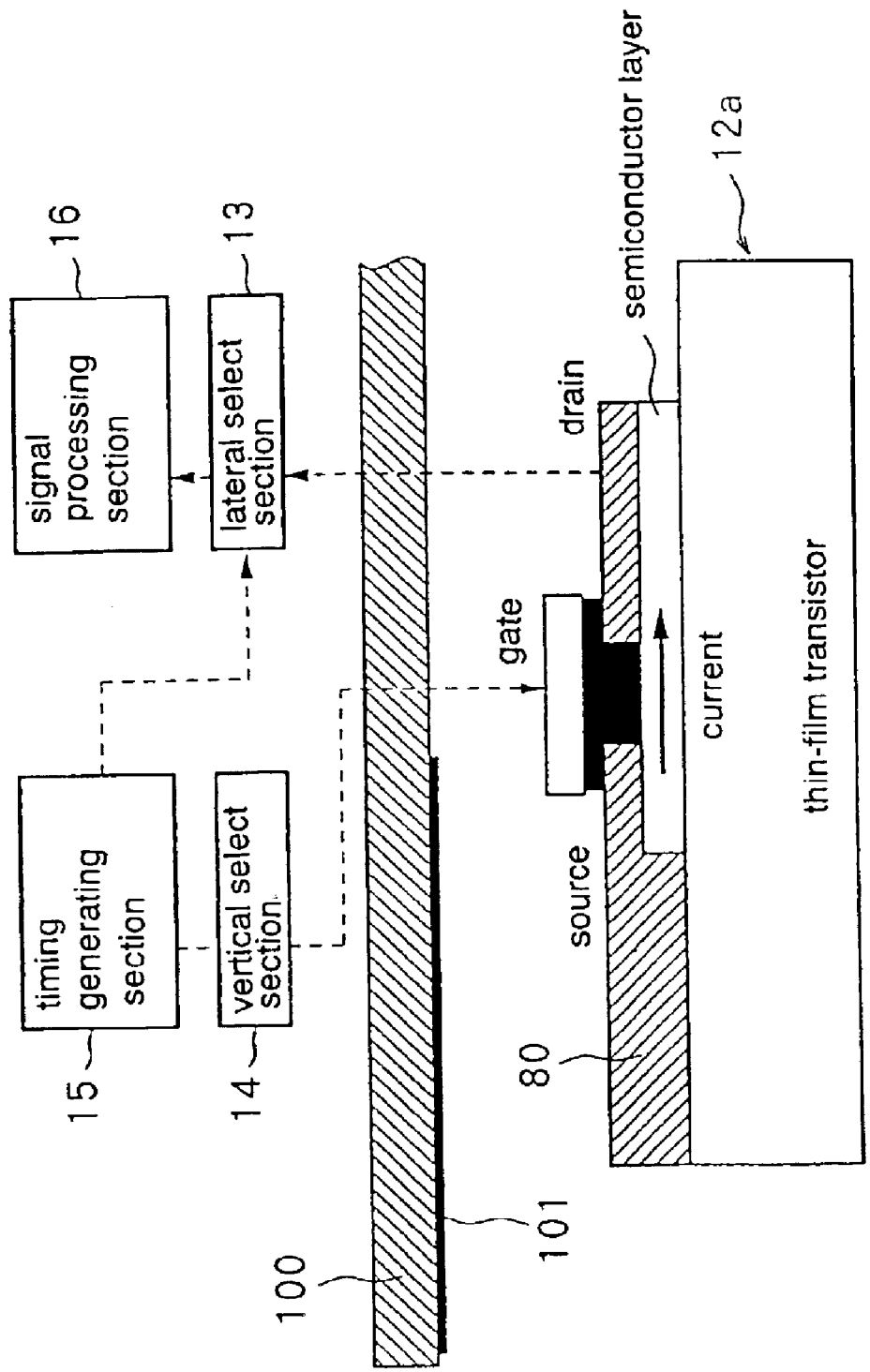
FIG. 17 is an explanatory block diagram of a sensor element according to a forth embodiment of the present invention.

With reference to FIG. 17, another Flash Sock Sensor as a fourth embodiment of the present invention will be described below.

The Flash Sock Sensor of this embodiment is different from that of the first embodiment in that this embodiment employs a thin-film transistor (TFT) as the sensor element. Since other components are similar to those of the first embodiment, the description about them will be omitted herein and the same components as those of the first embodiment will be defined by the same reference numerals in this figure.

FIG. 17 is an explanatory block diagram of one of sensor elements according to this embodiment.

A passive device 80 for detecting the potential variation in the liquid crystal electrode is an electrode formed of chromium or the like, and the electrode is formed continuously with a source of the thin-film transistor. A select signal from a vertical select section 14 is inputted into a gate of the thin-film transistor, and an output current outputted from a drain of the thin-film transistor as the detect signal is inputted into a signal processing section 16 through a lateral select section 13. A thin-film transistor layer formed of amorphous Si, polycrystalline Si or the like is provided as an under layer of the source and drain of the thin-film transistor.

The operation of this sensor element 12a is almost similar to that of the MOSFET described in FIGS. 7 and 8. When a select signal is applied to the gate of the thin-film transistor, a channel is generated in the semiconductor layer below the gate, and thereby the source and drain of the thin-film transistor is conducted each other. Then, when the potential at the liquid crystal electrode is increased and thereby electrons are concentrated on the electrode as the passive device 80, a current is outputted from the drain. This current is amplified at the lateral select section 13, and then is inputted into the signal processing section 16 in response to a timing signal generated by a timing generating section 15.

The thin-film transistor as the sensor element allows the productivity of the sensor elements to be improved. Further, the area of the sensor array can be increased.

This thin-film transistor may be used as a substitute for the MOSFET in the charge-voltage conversion circuit described in the second embodiment. In this case, the same effect may be obtained.

Another Embodiment

A function of holding electrons flowing into the sensor element may be provided additionally to the first, third and forth embodiments.

More specifically, if the passive device is provided with a structure capable of storing electrons therein, the stored electrons will be held until they are sucked up by a reset MOS transistor. For this purpose, the output current as the detect signal may be detected between the time just after the initiation of applying the voltage to the liquid crystal electrode as the detect signal after selecting the sensor element and the time when the sensor element is reset. Thus, as described in conjunction with FIG. 9, the timing of applying the voltage is not required to match with the timing of detecting the output current.

Further, a charge-transfer device may be used to transfer the stored electrons sequentially to the adjacent sensor element. For example, a charge coupled device (CCD) may be used as the charge-transfer device.

In this case, a charge-readout MOSFET may be used as the transistor. Then, the passive device may be formed continuously with a diffusion layer serving as a source of the charge-readout MOSFET, and the select signal may be input into a gate of the charge-readout MOSFET to lower a potential barrier formed below the gate. Then, a signal charge residing in the source may be transferred to a drain of the charge-readout MOSFET as a detect signal, and then the detect signal may be transferred by a charge-transfer device connected to the drain.

Furthermore, a charge-supply MOSFET for supplying a charge to the passive device in response to the potential variation in the liquid crystal electrode and forming a potential barrier so as not to cause the backflow of the supplied charge before completing the potential variation in the liquid crystal electrode may be provided, and a drain of this charge-supply MOSFET may be formed continuously with the diffusion layer serving as the passive device. This provides a stable charge transfer.

Any need for providing a switching circuit, such as a multiplexer, in the lateral select section can be eliminated by using the charge-transfer device.

Further, since the sensor elements in all of the above embodiments are semiconductor sensors, electrons can be generated due to a photoelectric conversion caused by irradiating light on the sensors, resulting in an improper operating. Thus, it is desirable to shield around the sensor element from light.

INDUSTRIAL APPLICABILITY

The present invention can provide an inspection apparatus and inspection method capable of inspecting the shape of a board used in a liquid crystal panel with high fineness and efficiency.

What is claimed is:

1. An inspection apparatus for inspecting a board used in a liquid crystal panel, in which a liquid crystal driving signal is applied to said board to cause a potential variation in an electrode of said board, and said potential variation is detected in a non-contact manner, said inspection apparatus comprising:

detect means for detecting the potential variation in said electrode by use of a plurality of sensor elements; and select means for outputting a select signal for selecting said sensor elements, wherein each of said sensor elements is formed on a single crystal of a semiconductor or on a flat plate, and each of said sensor elements includes;

a passive device operable as a counter electrode coupled capacitively with said electrode to detect the potential variation in said electrode and generate a detect signal, and a transistor adapted to output said detect signal in response to said select signal.

2. An inspection apparatus as defined in claim 1, wherein each of said sensor elements include sensor electrodes that are located around a position at which a counter electrode serving as one component of said liquid crystal panel is to be installed.

3. An inspection apparatus as defined in claim 1, wherein said liquid crystal panel is a TFT liquid crystal panel comprising a thin-film transistor having a source electrode, drain electrode and gate electrode, wherein said detect means is adapted to detect the potential variation in said drain electrode caused by applying the liquid crystal driving signal to said source and gate electrodes.

4. An inspection apparatus as defined in claim 1, wherein said transistor of each of said sensor elements is a current-readout MOSFET having a source, drain and gate, wherein said passive device is continuously formed with a diffusion layer served as said source, and said detect signal is obtained front said drain by inputting said select signal into said gate.

5. An inspection apparatus as defined in claim 1, wherein said transistor of each of said sensor elements is a current-readout thin-film transistor having a source, drain and gate, wherein said passive device is connected to said source, and said detect signal is obtained from said drain by inputting said select signal into said gate.

6. An inspection apparatus as defined in claim 1, wherein said transistor of each of said sensor elements includes a first MOSFET and a second MOSFET connected in series with each other, wherein said passive device is connected to a gaze of said first MOSFET, and said select signal is connected to a gate of said second MOSFET, wherein a potential of a source of said first MOSFET is varied in response to the potential of said passive device applied to said gate of said first MOSFET, said varied potential being received by a drain of said second MOSFET, and said received potential being outputted from a source of said second MOSFET as said detect signal.

7. An inspection apparatus as defined in claim 1, wherein said transistor of each of said sensor elements includes a first thin-film transistor and a second first thin-film transistor connected in series with each other, wherein said passive device is connected to a gate of said first thin-film transistor, and said select signal is connected to a gate of said second thin-film transistor, wherein a potential of a source of said first thin-film transistor is varied in response to be potential of said passive device applied to said gate of said first thin-film transistor, said varied potential being received by a drain of said second thin-film transistor, and said received potential being outputted from a source of said second thin-film transistor as said detect signal.

8. An inspection apparatus as defined in claim 1, wherein said transistor of each of said sensor elements is a bipolar transistor having an emitter, collector and base, wherein said passive device is connected to said emitter, and said detect signal is obtained from said collector by inputting said select signal to said base.

9. An inspection apparatus as defined in claim 1, which further includes a charge-supply MOSFET for supplying a charge to said passive device in response to the potential variation in said electrode to form a potential barrier so as not to cause the backflow of said supplied charge before completing the potential variation in said electrode, said charge-supply MOSFET having a drain formed continuously with diffusion layer serving as said passive device.

10. An inspection apparatus as defined in claim 1, wherein said sensor elements are arranged in a matrix form.

11. An inspection apparatus as defined in claim 1, which further includes a conductor plate in contact with the surface of said passive device.

12. A method for inspecting a board used in a liquid crystal panel, in which a liquid crystal driving signal is applied to said board to cause a potential variation in an electrode of a board used in said liquid crystal panel, wherein each of a plurality of sensor elements is formed on a single crystal of a semiconductor or on a flat plate, and each of said sensor elements includes a passive device and a transistor, said method including;

locating said plurality of sensor elements without contact near said board;

applying a liquid crystal driving signal to said board to cause a potential variation in an electrode of said board;

coupling, as a counter electrode, said passive device with said electrode of said board to detect a potential variation in said board electrode, said coupling being effected in a non-contact manner; and using said transistor to output a detect signal from said passive device.

* * * * *